United States Patent
Dodge et al.

(10) Patent No.: US 9,221,116 B2
(45) Date of Patent: Dec. 29, 2015

(54) INDUCTIVE DISCHARGE ARC RE-IGNITION AND STABILIZING CIRCUIT

(71) Applicant: LINCOLN GLOBAL, INC., City of Industry, CA (US)

(72) Inventors: Robert Dodge, Mentor, OH (US); George Koprivnak, Painesville, OH (US); Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 312 days.

(21) Appl. No.: 13/793,294

(22) Filed: Mar. 11, 2013

(65) Prior Publication Data

US 2014/0251966 A1 Sep. 11, 2014

(51) Int. Cl.
*B23K 9/073* (2006.01)
*B23K 9/09* (2006.01)
*B23K 9/10* (2006.01)
*B23K 9/167* (2006.01)

(52) U.S. Cl.
CPC .............. *B23K 9/0738* (2013.01); *B23K 9/09* (2013.01); *B23K 9/1043* (2013.01); *B23K 9/167* (2013.01)

(58) Field of Classification Search
CPC .................................. B23K 9/09; B23K 9/073
USPC ......................................... 219/130.4, 130.51
See application file for complete search history.

(56) References Cited

U.S. PATENT DOCUMENTS

| 3,328,637 | A | 6/1967 | Aldenhoff |
| 4,038,515 | A | 7/1977 | Risberg |
| 4,876,433 | A | 10/1989 | Kashima et al. |
| 5,338,916 | A | 8/1994 | Blankenship et al. |
| 6,472,634 | B1 * | 10/2002 | Houston et al. ............ 219/130.5 |
| 7,385,159 | B2 | 6/2008 | Stava |

OTHER PUBLICATIONS

International Application No. PCT/IB2014/000265, International Search Report, 4 pages, Oct. 1, 2014.

* cited by examiner

*Primary Examiner* — Brian Jennison
(74) *Attorney, Agent, or Firm* — Perkins Coie LLP

(57) ABSTRACT

A system and method for re-igniting and stabilizing an arc is provided. The system includes an output system that provides an output waveform, which includes a positive period and a negative period. The positive period includes a positive decay period prior to a transition to the negative period, and the negative period includes a negative decay period prior to a transition to said positive period. The system further includes an inductive discharge and stabilizing system, which includes at least one inductor. The at least one inductor re-ignites an arc between an electrode and a workpiece during the transition period from the positive period to the negative period and the transition period from the negative period to the positive period. The at least one inductor also provides a stabilizing current to stabilize said arc during at least a portion of said positive period and at least a portion of said negative period.

30 Claims, 14 Drawing Sheets

INDUCTIVE DISCHARGE ARC RE-IGNITION AND STABILIZING CIRCUIT

TECHNICAL FIELD

Certain embodiments relate to arc welding applications. More particularly, certain embodiments relate to controlling arc initiation using inductive discharge in a system and method for any of brazing, cladding, building up, filling, hard-facing overlaying, joining and welding applications.

BACKGROUND

In some arc welding systems, the welding machines require some means of non-contact arc initiation and re-ignition. For example, welding power supplies may include a high frequency ignition circuit (such as a capacitor discharge circuit or a spark gap tank circuit) to assist in bridging the gap from the electrode to the workpiece. When welding in AC mode, arc stability is an issue because there is a possibility the arc may not re-light each time the waveform goes through zero current when the polarity is switched. Indeed, it is nearly impossible to prevent the arc from going out during a zero transition. The typical arc voltage is usually less than 30 volts and a much higher voltage is required to reliably sustain the arc under all conditions. Depending on the process, the required voltage may be up to 100 volts or more. In a typical system, elevated voltages are transiently supplied by various passive elements in the welding circuit such as the output choke, but are generally limited to the Open Circuit Voltage (OCV) of the power supply. As discussed above, AC welding is a special case because the arc extinguishes at each polarity reversal, and the OCV of the power source is typically not enough to reestablish the arc. Generally, the OCV of the power supply must be as high as 100 volts OCV in order to sustain the arc. However, at reverse polarity, there is only about 50 volts OCV plus any voltage from the output choke to reestablish the arc. This voltage is typically not enough to reestablish the arc. Accordingly, the challenge is to provide a means to re-ignite the arc after the welding waveform passes through the zero transition. To this end, a number of methods exist that impose an elevated voltage across the welding load to re-ignite the hot ionized gas as the waveform transitions to the opposite polarity.

For example, high frequency ignition circuits can be turned on each time the AC waveform changes polarity. The high frequency ignition circuit induces high voltage, high frequency pulses that generate sparks between the electrode and workpiece to initiate the arc. The high frequency ignition circuit is a reliable method of re-igniting the arc. However, the electrical noise from these high frequency ignition circuits can damage the electronics in modern welding power supplies and other sensitive equipment located in the vicinity or workplace. Other methods include a superposition or a center tapped choke to reestablish the arc when the polarity is switched. Because these methods do not use high voltage, high frequency pulses, the sensitive electronics are less susceptible to getting damaged by the electrical noise. However, in extreme conditions, the welding process may still experience a "pop out," i.e., the arc does not re-ignite. Further, once the energy in the center-tapped choke circuit is released, the process will need to wait until it charges again. Additional information concerning superposition circuits and center-tap choke circuits can be found in U.S. Pat. No. 7,385,159, which is incorporated by reference herein in its entirety as background material.

In addition to the above, prior art methods do not provide for low current stability and waveform smoothing. The physical nature of the arc is influenced by properties such as the material being welded, weld puddle size, heat input, etc. and the voltage or length of the arc can be significantly high. In such cases, the voltage necessary to sustain the arc can instantaneously exceed the voltage provided by the power supply and the arc will extinguish.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise controlling arc initiation using inductive discharge in a system and method for any of brazing, cladding, building up, filling, hard-facing overlaying, joining and welding applications. The system includes an output system that provides an output waveform, which includes a positive period and a negative period. The positive period includes a positive decay period prior to a transition to the negative period, and the negative period includes a negative decay period prior to a transition to said positive period. The system further includes an inductive discharge and stabilizing system, which includes at least one inductor. The at least one inductor re-ignites an arc between an electrode and a workpiece during the transition period between from the positive period to the negative period and the transition period from the negative period to the positive period. The at least one inductor also provides a stabilizing current to stabilize said arc during at least a portion of said positive period and at least a portion of said negative period.

The method includes providing an output waveform to one of an electrode and a workpiece. The output waveform includes a positive period and a negative period. The positive period includes a positive decay period prior to a transition to the negative period, and the negative period includes a negative decay period prior to a transition to the positive period. The method also includes providing at least one inductor and controlling the at least one inductor to re-ignite an arc between the electrode and the workpiece during the transition period between from the positive period to the negative period and the transition period from the negative period to the positive period. The at least one inductor provides a stabilizing current to stabilize the arc during at least a portion of said positive period and at least a portion of said negative period.

The method also includes providing an inductive discharge and stabilization circuit to initiate and/or re-ignite an arc and to provide arc stabilization during low current operations in both AC and DC applications. The method further includes monitoring a charging of an inductor in the inductive discharge circuit to determine a status of the charge and controlling at least inductive discharge circuit based on the status.

Other exemplary embodiments of the present invention include a power supply for use in a system and method for any of brazing, cladding, building up, filling, hard-facing overlaying, joining and welding applications. The power supply includes an output circuit configured to provide at least one of a voltage and current waveform. The power supply also includes an arc re-ignition and stabilization circuit that re-ignites the arc during zero transitions and provides arc stability during low-current operations. The power supply further includes a control unit operatively connected to at least the re-ignition and stabilization circuit. The control unit is configured to monitor and control at least a charging of re-ignition inductor. The control unit can also be configured to control the voltage or current waveform.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
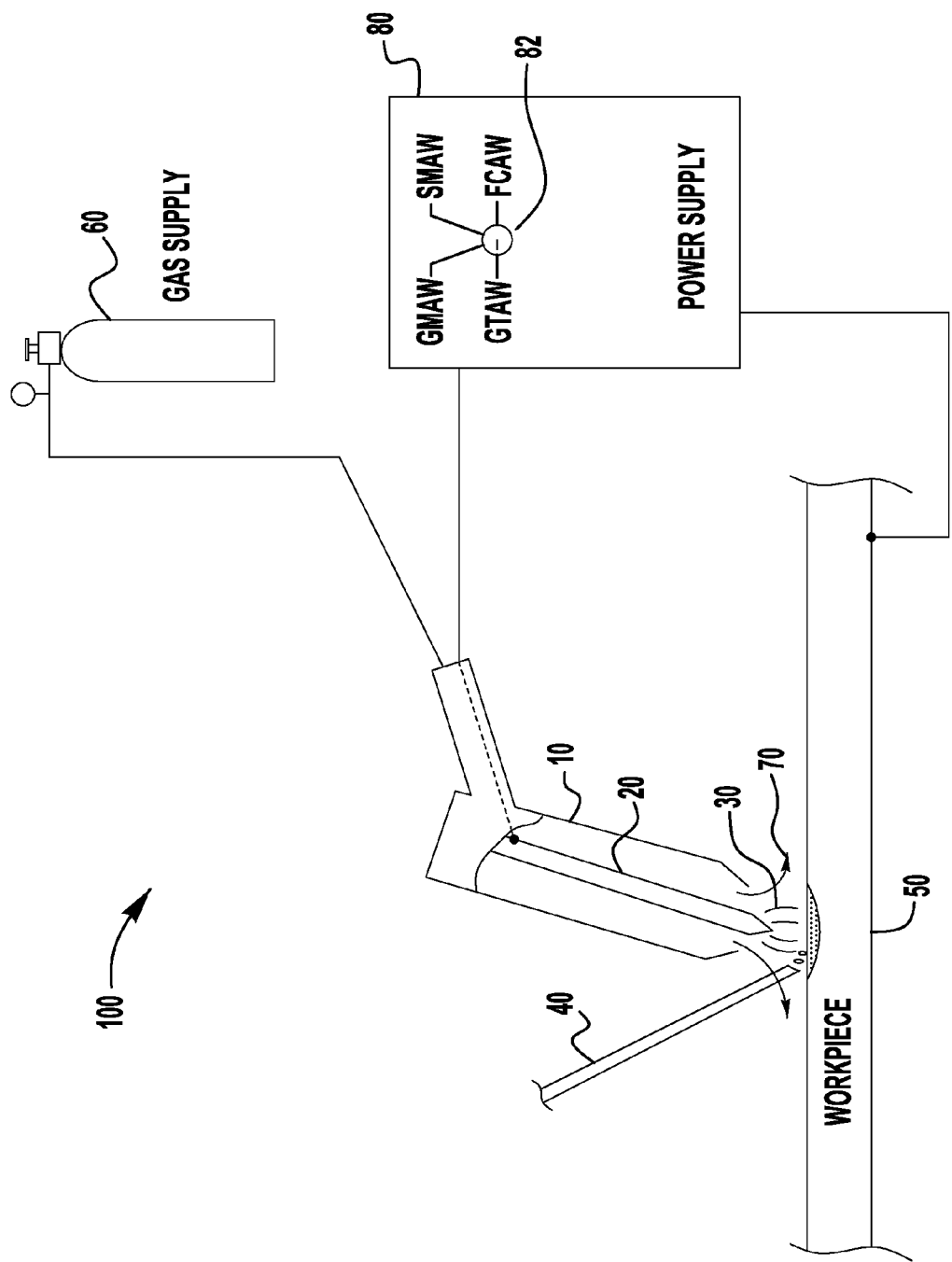
FIG. 1 illustrates a functional schematic block diagram of an exemplary embodiments of a system for any of brazing, cladding, building up, filling, hard-facing overlaying, joining, and welding applications.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 illustrates a system 100 for any of brazing, cladding, building up, filling, hard-facing overlaying, joining, and welding applications. The system 100 includes a welding power supply 80, which can be an inverter-type power supply or a chopper based power supply with appropriate AC module. The general configuration of power supply 80 is known in the art, except for the discussions set forth herein, and for brevity will not be further discussed. An example of such a power supply is the Power Wave® S350 manufactured by The Lincoln Electric Company of Cleveland, Ohio.

The power supply 80 can be a state-based programmable controller in which the selector switch 82 can be programmed to select different synergic programs that are specific to a desired welding operation. For example, as illustrated in FIG. 1, the specific synergic programs that can be selected by the selector switch 82 can include programs for performing processes such as, e.g., gas tungsten arc welding (GTAW), gas metal arc welding (GMAW), shielded metal arc welding (SMAW), flux cored arc welding (FCAW), etc. In addition, the synergic programs can also include programs for specific welding waveform types used in such processes (e.g., AC pulse, AC TIG, DC TIG, AC surface tension transfer (STT), etc.), programs for different arc starting methods (e.g., touch start, high frequency starting, etc.), programs for specific consumable diameters (e.g., 0.035, 0.045, etc.), programs for specific weld material types (e.g., steel, aluminum, etc.), and combinations thereof (e.g., "0.045 steel AC pulse," AC TIG with high frequency starting," "0.035 AC STT," etc.). For clarity, however, the specification will describe the present invention with respect to a welding application and, more specifically, with respect to a GTAW application, but the present invention can be applied to any AC and DC application related to any of brazing, cladding, building up, filling, hard-facing overlaying, welding, and joining applications.

Figure 2:
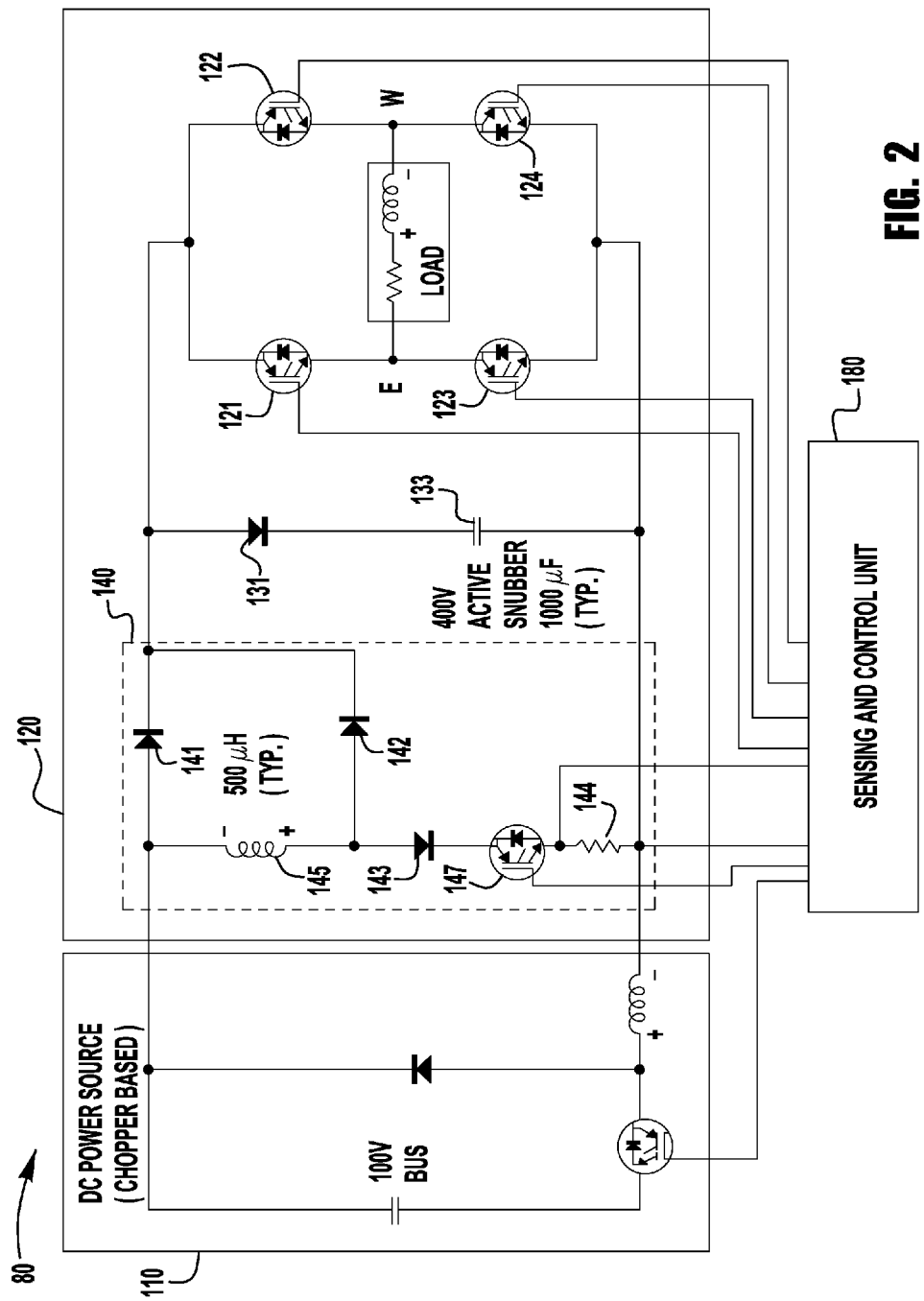
FIG. 2 illustrates an exemplary power supply with an arc re-ignition and stabilization circuit that can be used in the system of FIG. 1.
Figure 3:
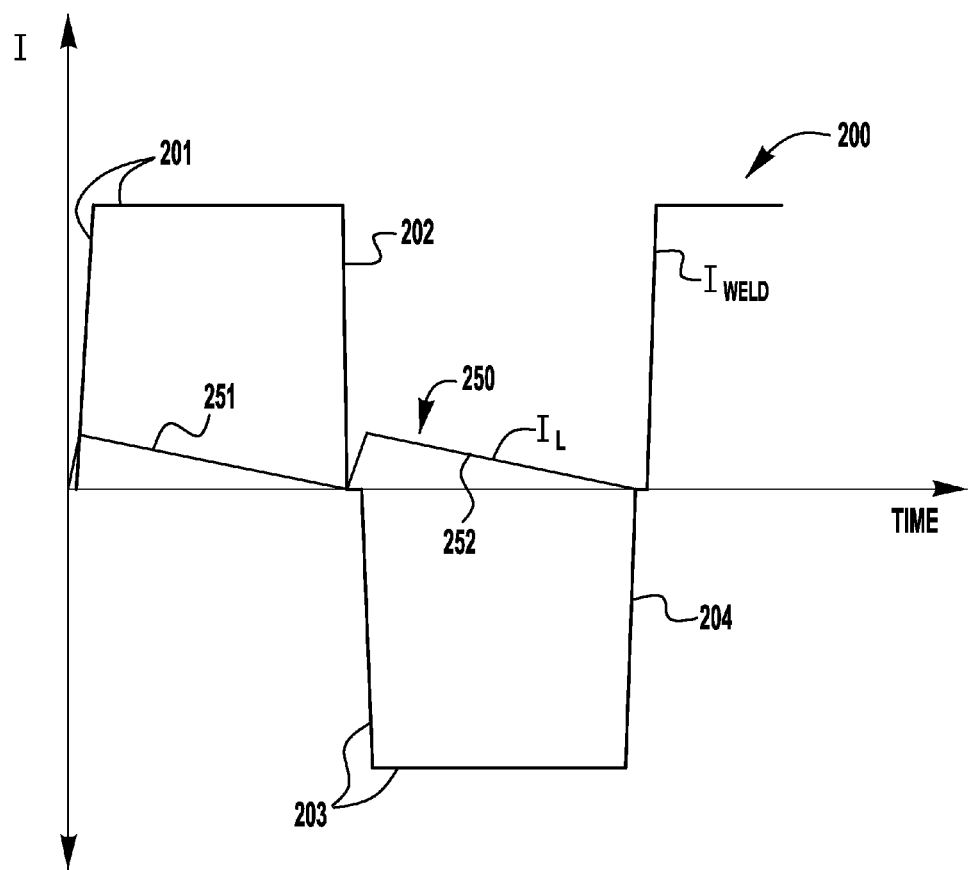
FIG. 3 illustrates an exemplary output welding waveform and an exemplary inductor current from the re-ignition and stabilization circuit from the power supply of FIG. 2.

As illustrated in FIG. 1, the power supply 80 is operatively connected to electrode 20, which is housed in torch 10. The power supply 80 and electrode 20 produce arc 30, which heats workpiece 50. An optional wire feed system (not shown) feeds filler wire 40, which provides filler material to a molten puddle produced by the arc 30. As illustrated in FIG. 2, the power supply 80 includes a DC power source 110 and an output circuit 120. The output circuit 120 receives the output of DC power source 110 and converts it to a welding waveform signal. For example, the output circuit 120 can receive a 100-volt DC output from DC power source 110 and convert it to an AC square wave current welding waveform signal as illustrated in FIG. 3. The output circuit 120 can be incorporated into power supply 80 or be external to power supply 80. Of course, the present invention is not limited to square waves and other type of waveforms such as triangular waveforms, sine waves, etc. can also be used. In addition, the output waveform is not limited to a current waveform and a voltage waveform or other waveforms (e.g. based on power or other voltage/current characteristics) can be used. Further, the output circuit 120 is not limited to the full-bridge operation shown in FIG. 2, and the present invention can also be implemented with a half-bridge configuration as illustrated in FIGS. 5A-5E.

As shown in FIG. 2, switches 121-124 form a full bridge circuit that, based on the switch configuration, directs current flow from electrode E to workpiece W or from workpiece W to electrode E. For example, when switches 121 and 124 are ON (closed) and switches 122 and 123 are OFF (open), the current from DC power source 110 will flow to the electrode E and then to the workpiece W (electrode positive configuration) via the arc 30 (see FIG. 1). When switches 122 and 123 are ON (closed) and switches 121 and 124 are OFF (open), the current from DC power source 100 flows to the workpiece W and then to the electrode E via the arc 30. The switches 121-124 can be solid state switches such as, e.g., IGBTs. The LOAD represents the output inductance and resistance of the power supply 80, including external welding setups such as, e.g., the welding leads.

The output circuit 120 also includes a diode 131 and high-voltage active snubber 132. The snubber 132 serves two functions. First, the snubber 132 provides over-voltage protection to the output circuit 120 by providing an alternative path for the current in the circuit. For example, the high-voltage snubber 132 can be set for, e.g., 400 volts such that the output circuit 120 dissipates energy into the snubber reservoir if the voltage at the input to diode 131 exceeds 400 volts. In addition to the over-voltage protection, the high-voltage snubber 132 serves to quickly decay the welding current when the welding waveform switches from one polarity to another. The switching process is explained further below.

The output circuit 120 further includes an arc re-ignition and stabilization circuit 140 that comprises diodes 141-143, re-ignition inductor 145, charging switch 147 and sensing resistor 149. Energy is stored in re-ignition inductor 145 when charging switch 147 is ON (closed). The voltage across sensing resistor 149 can be monitored by a sensing and control circuit 180 to indicate when the inductor 145 has charged to a desired level. When the switch 147 is OFF (open) the current through inductor 145 is directed through diode 142 and to either the electrode E or workpiece W (depending on the arrangement of switches 121-124) to re-ignite the arc 30 and then to help maintain the stability of the arc 30. Diode 143 is a blocking diode to prevent "freewheeling" through the anti-parallel diode in switch 147, which can be, e.g., an IGBT (switch), during the current decay. Allowing such freewheeling would provide an alternate low voltage path around the high voltage snubber and slow the decay rate.

Figure 4A:
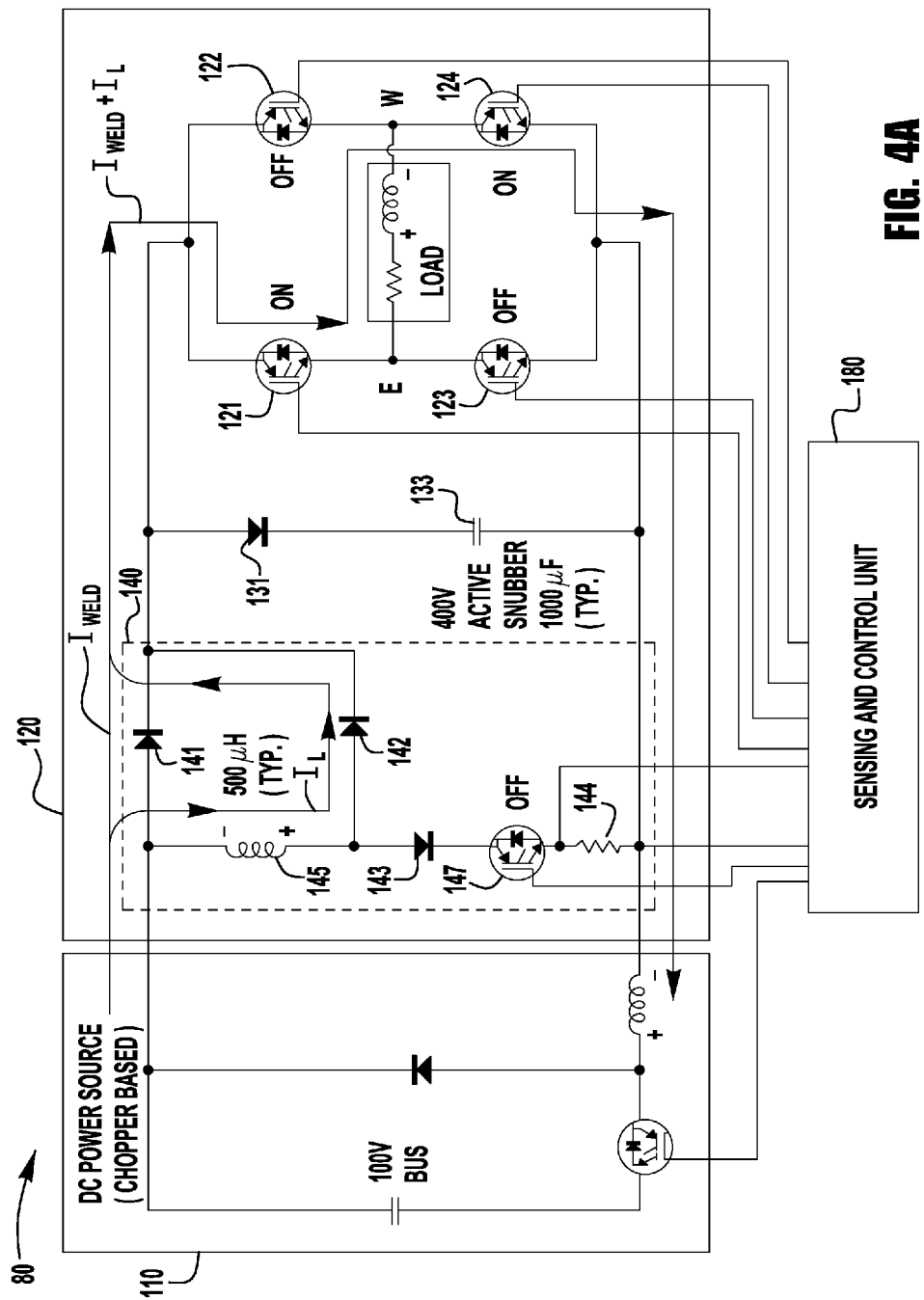
FIGS. 4A-4E illustrate the operation of the exemplary power supply of FIG. 2 using a full bridge operation.

An exemplary operation of the power supply 80 will be discussed with respect to an exemplary welding waveform, e.g., a current waveform. As illustrated in FIG. 3, the exemplary current welding waveform 200, i.e., $I_{WELD}$, is a square wave with segments 201-204. After the arc 30 has been established (either initially or re-ignition), the welding waveform 200, which is output from power supply 80, enters its positive pulse period (segment 201). As illustrated in FIG. 4A, during this period, the switches 121 and 124 are ON (closed) and switches 122 and 123 are OFF (open). Thus, the current $I_{WELD}$ from the output of the DC power source 100 will flow to electrode E via diode 141 and switch 121. In addition to the current $I_{WELD}$, inductor current $I_L$ (see FIG. 4A and waveform 250 in FIG. 3) flows from the inductor 145 to electrode E via diode 143 and switch 121. From electrode E, these currents ($I_{WELD}$ and $I_L$) will flow to workpiece W via the arc 30 and then back to the power source 100 through switch 124.

The inductor current $I_L$ represents the discharging of energy stored in the inductor 145. That is, as illustrated by segment 251 in FIG. 3, once the arc 30 has been initially established or re-ignited by the energy in inductor 145, the remaining stored energy in inductor 145 will be applied to the arc load during the positive pulse period (segment 201) of waveform 200. The inductor current $I_L$ (i.e., segment 251) will go down to a minimum current dictated by the equilibrium reached between parallel path established with diode 141 and inductor 145 and diode 142. The minimum (steady state DC) current through the inductor is as follows:

$$I_{ind} = (V_{D141} - V_{D142})/R_{DCind}$$

$V_{D141}$ and therefore $I_{ind}$ increases with weld current. The value is passively limited by the DC resistance of the coil, and typically ranges from 1 A to 20 A over the rated output range.

The inductor current $I_L$ (i.e., segment 251) helps to stabilize the arc 30, especially during low current welding operations. Accordingly, the re-ignition inductor 145 is sized such that, along with storing enough energy to re-ignite the arc 30, the remaining stored energy will discharge by the time the welding waveform 200 reaches the end of the segment 201. In a typical re-ignition circuit, the inductor 145 can be between 300 and 900 micro-henries. For example, the inductor 145 can have a value of approximately 500 micro-henries. Of course, these inductor values are not limiting and depending on the welding process, the inductor 145 can have other values.

At the end of the positive pulse period (segment 201), the welding waveform 200 switches polarity and goes to the negative pulse period (segment 203). However, prior to the polarity change, the current $I_{WELD}$ must first decay to zero at which time the arc 30 will extinguish and must be re-ignited. In order to minimize disruptions to the welding process, the decay of the welding current $I_{WELD}$ (see segment 202) and the re-ignition of the arc 30 needs to occur as quickly as possible. However, inductance in the welding system, e.g., inductance in the welding leads, will tend to prolong the decay of the welding current, as the stored inductive energy in the welding system must first be dissipated.

Figure 4B:
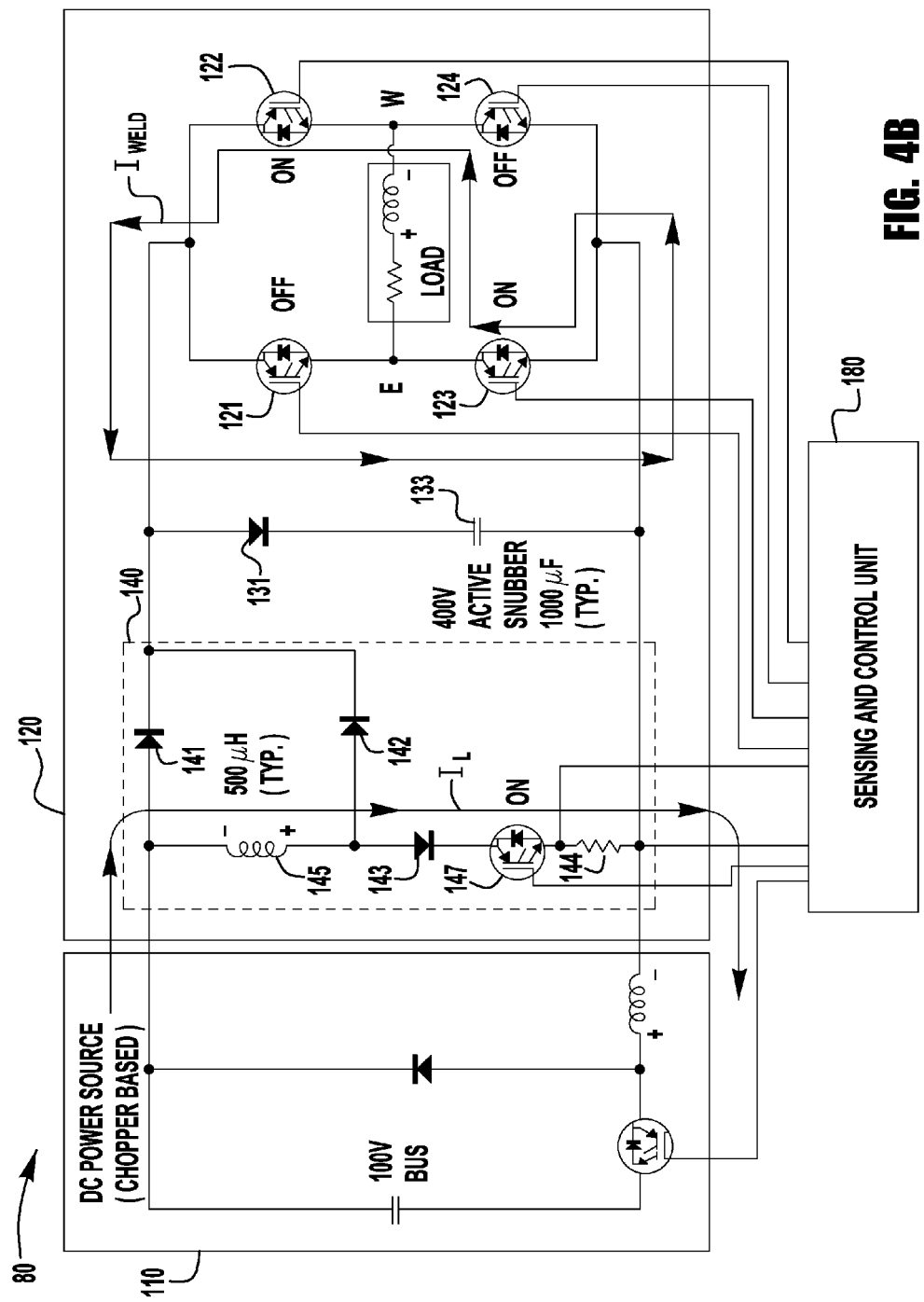

As illustrated in FIG. 4B, to hasten this decay, the sensing and control unit 180 controls switches 121-124 such that the current $I_{WELD}$ is diverted through diode 131 and then to the high-voltage active snubber 133. That is, at the end of the positive pulse period, switches 122 and 123 are turned ON (closed) and switches 121 and 124 are turned OFF (open) in order to reroute the current $I_{WELD}$ to the snubber reservoir via the anti-parallel diodes of switches 122 and 123 as shown in FIG. 4B. The high voltage imposed by the snubber 133, e.g. 400 volts, depletes the arc energy and rapidly decays the welding current (see segment 202 of waveform 200 in FIG. 3). In some embodiments, the snubber 133 is a capacitor and can be in the range of 500 to 1500 micro-farads depending on the cable inductance and switching threshold. For example, a typical snubber capacitor can be about 1000 micro-farads. The snubber capacitor is sized such that it absorbs the energy stored by the weld cables and limits the resulting voltage increase. Assuming all of the cable energy is absorbed by the snubber, the voltage increase per zero cross is as follows:

$$V_{increase} = I_{switch\ threshold} (L_{cable}/C_{snubber})^{-0.5}$$

Of course, some energy may be lost to the switches or absorbed by other components and reapplied to the arc at or after the zero crossings.

During the time period that the current $I_{WELD}$ is decaying to zero, the sensing and control unit 180 is also charging inductor 145 in preparation for re-igniting the arc 30. Thus, unlike a conventional center tap choke circuit, which will lose its energy while the arc current is decaying, the present invention diverts energy to charge inductor 145 while the current $I_{WELD}$ is decaying. To charge the inductor 145, the sensing and control unit 180 turns ON (closes) switch 147 so that the output of DC power source 100 is used to charge inductor 145 as illustrated in FIG. 4B. The magnitude of current $I_L$ in the inductor 145 will be limited to the value regulated by the power source 80, which is typically the value of the current when the polarity switch was initiated. As such, the inductor current is controlled by the process. However, in some embodiments, the charging of inductor 145 can be limited to a desired maximum by monitoring the current $I_L$ by, e.g., measuring a voltage V across resistor 149 and then taking certain actions based on the measurement. For example, the sensing and control circuit 180 can monitor the voltage across resistor 149 and turn OFF (open) switch 147 when the voltage reaches a preset value. In addition (or in the alternative), the switch 147 can be turned OFF (open) after a predetermined charging time has elapsed. The discharging of the arc current $I_{WELD}$ and the charging of inductor 145 are completed simultaneously, e.g., within ±10 µsec, but can extend to ±100 µsec.

After the inductor 145 has charged sufficiently, the sensing and control unit will turn OFF (open) switch 147. Because the inductor 145 will attempt to maintain a current flow so long as there is stored energy, the inductor 145 will attempt to direct the current $I_L$ through the diode 142 and across the LOAD through switches 121 and 124 of the bridge circuit and back to DC power source 110. However, because the arc 30 has been extinguished due to the zero crossing, there is a gap in the current path, i.e., the gap between electrode E and workpiece W. Because the current path has been interrupted, the output voltage of the inductor 145 will rise to a level that will cause a spark across the gap to reestablish the arc 30. That is, the voltage at workpiece W will rise to a value needed to create a spark between workpiece W and electrode E. Once the spark is formed, the current path and the arc 30 will be reestablished. The snubber 133 provides over-voltage protection for the circuit by providing a path for the inductor current if the voltage gets too high. For example, if the snubber 133 is configured for 400 volts, the voltage across the gap will be limited to 400 volts because voltages above 400 volts will cause a current to flow from inductor 145 through diode 131 and into snubber 133.

Figure 4C:
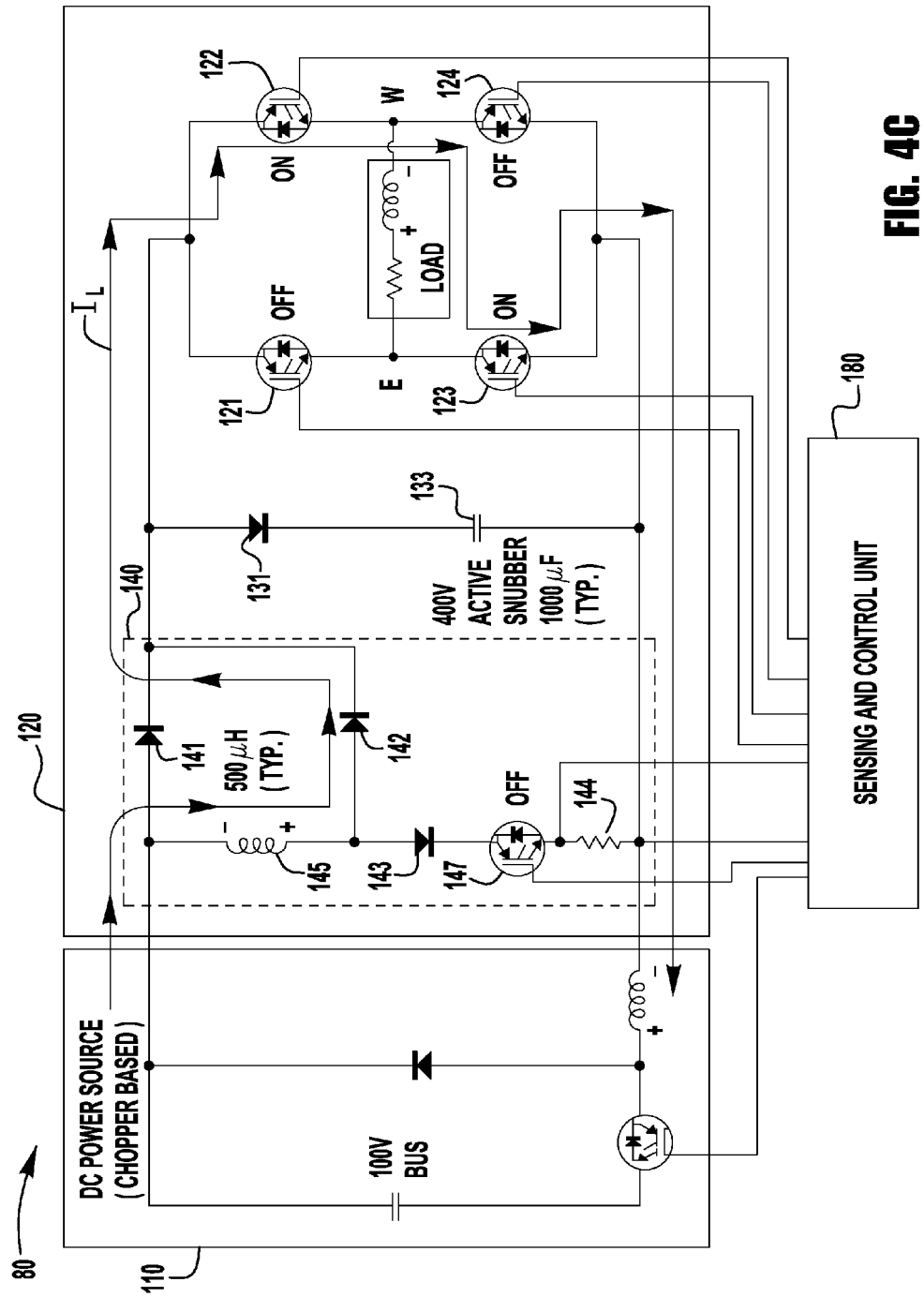
Figure 4D:
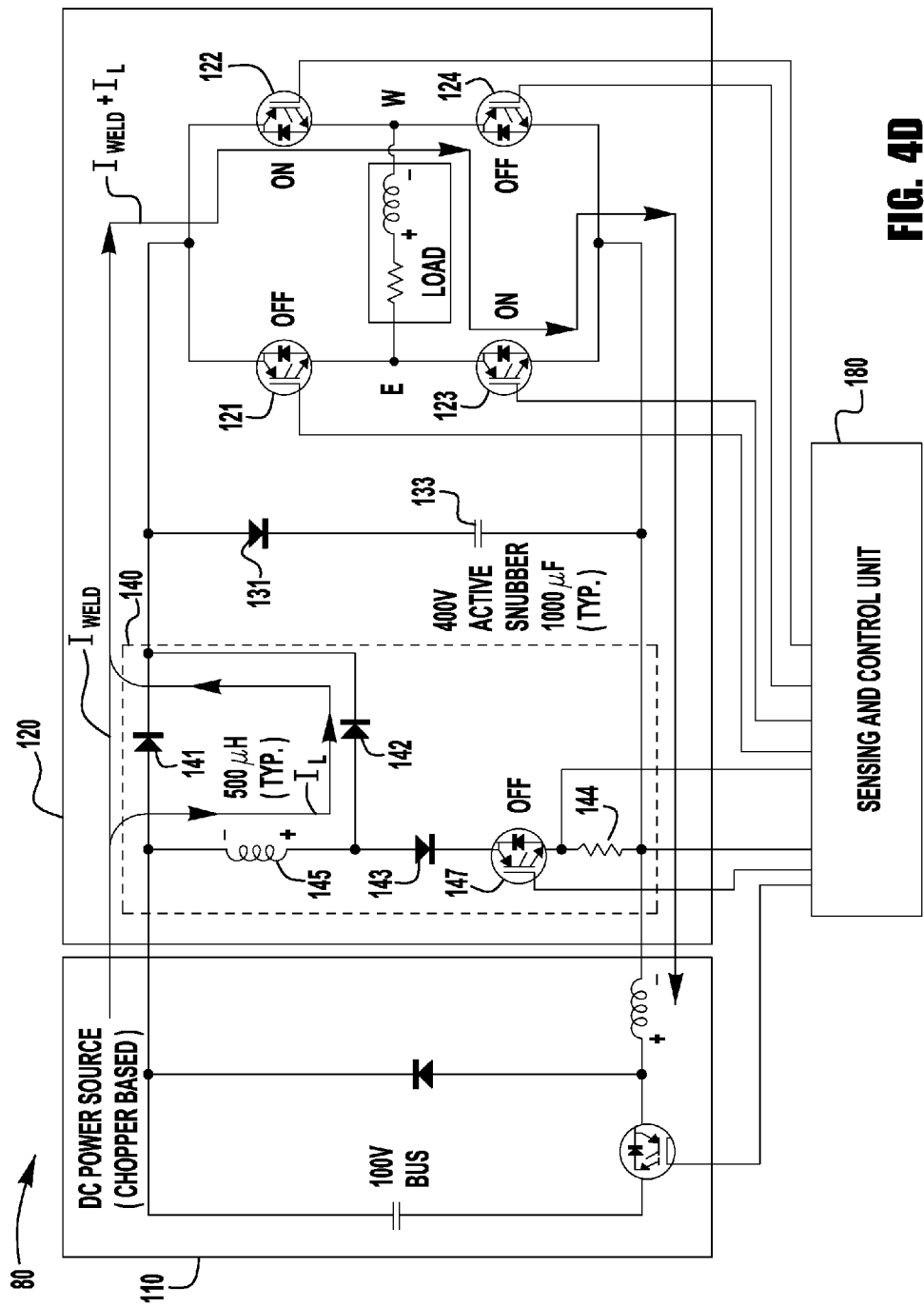

As illustrated in FIG. 4C, during the re-ignition phase, the sensing and control unit 185 keeps the switches 121-124 in their previous state, i.e., switches 121 and 124 are OFF (open) and switches 122 and 123 are ON (closed). Accordingly, once the arc 30 has been re-ignited, the inductor current $I_L$ will flow in a direction that is opposite that of the positive pulse discussed above, i.e., the current will flow from the workpiece W to the electrode E. Because the switches 121-124 are already in the proper states for the negative pulse period (segment 203) of waveform 200, the current $I_{WELD}$ will immediately start to flow from the DC power source 110 once the arc 30 (and therefore the current path) has been established. That is, as illustrated in FIG. 4D, once the arc 30 is re-ignited by inductor 145, the welding waveform 200 enters the negative pulse period (segment 203) and the current $I_{WELD}$ flows from the workpiece W to the electrode E. The operation of the output circuit 120 during the negative pulse is similar to that discussed above with respect to the positive pulse. As in the positive pulse period, once the arc 30 has been established, the remaining stored energy in inductor 145 will be applied to the arc load where the inductor current $I_L$ helps to stabilize the arc 30 (see segment 252 of FIG. 3), especially during low current welding operations.

Figure 4E:
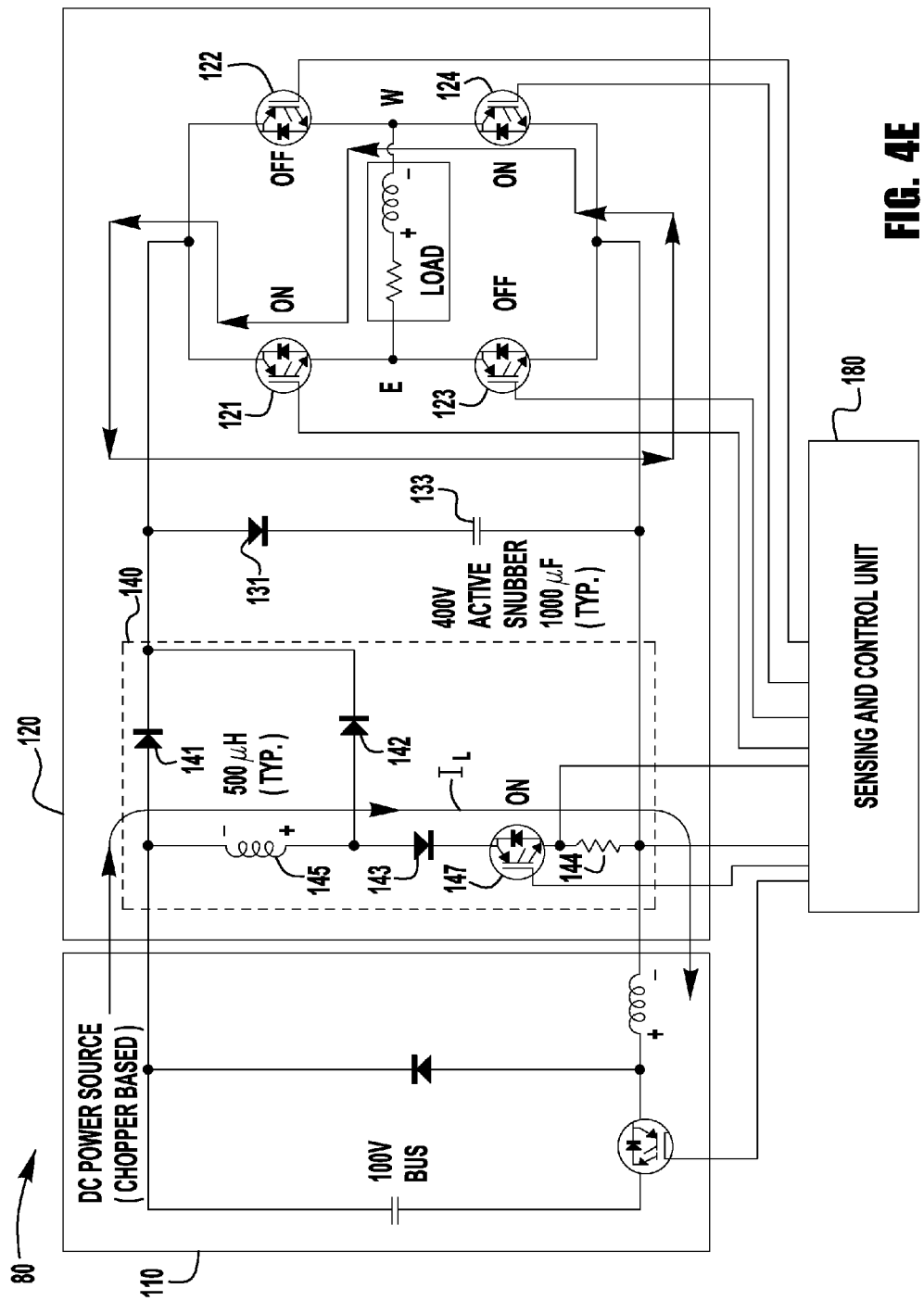

Similar to the positive pulse discussed above, once the welding waveform 200 is at the end of the negative pulse period (segment 203), the sensing and control unit 180 controls switches 121-124 so that the current $I_{WELD}$ will rapidly decay to zero (see segment 204 of FIG. 3) in order to switch polarity. As illustrated in FIG. 4E, the sensing and control unit 180 will turn ON (close) switches 121 and 124 and turn OFF (open) switches 122 and 123 so that the current $I_{WELD}$ will be directed to snubber 133 via the anti-parallel diodes of 121 and 124. In addition, as discussed above with respect to the positive pulse, while the negative pulse decay is occurring, the sensing and control unit 180 will turn on switch 147 in order to charge inductor 145. After the inductor 145 has charged and the current $I_{WELD}$ has decayed to zero, the welding waveform will enter the positive pulse period (segment 201) as discussed above.

The above exemplary embodiment uses a full-bridge operation in the output circuit. However, the present invention is not limited to full-bridge operation and can be used in a half-bridge configuration as illustrated in FIGS. 5A-5E. As shown in FIGS. 5A-5E, the output circuit 320 receives the output of DC power source 310, which can be an inverter-based power source. The DC power source 310 has a center-tap configuration such that, based on the configuration of switches 321 and 322 of the half-bridge circuit, the current will either flow from the Positive Rectifies to the center-tap or from the center-tap to the Negative Rectifiers. The output circuit includes an arc re-ignition and stabilization circuit 340 that includes inductors 345A and 345B. Inductors 345A and 345B are coupled inductors and their operation is discussed below. The arc re-ignition and stabilization circuit 340 also includes a switch 347 that, along with diodes 341-343, controls the charging/discharging operations of inductors 345A and 345B. The output circuit 320 also includes a snubber circuit with snubber 333 and diode 331. As with the full-wave circuit discussed above, the output circuit 320 and DC power source 310 can be incorporated into one power supply or be separate components. In addition, the output waveform can be any desired waveform such as a triangular waveform, a sinewave, a square wave, etc. For example, the output waveform can be the waveform 400 illustrated in FIG. 6. The functions of the components in output circuit 320 are similar to that discussed above with respect the full-bridge circuit and, for brevity, only the pertinent differences will be discussed.

Figure 5A:
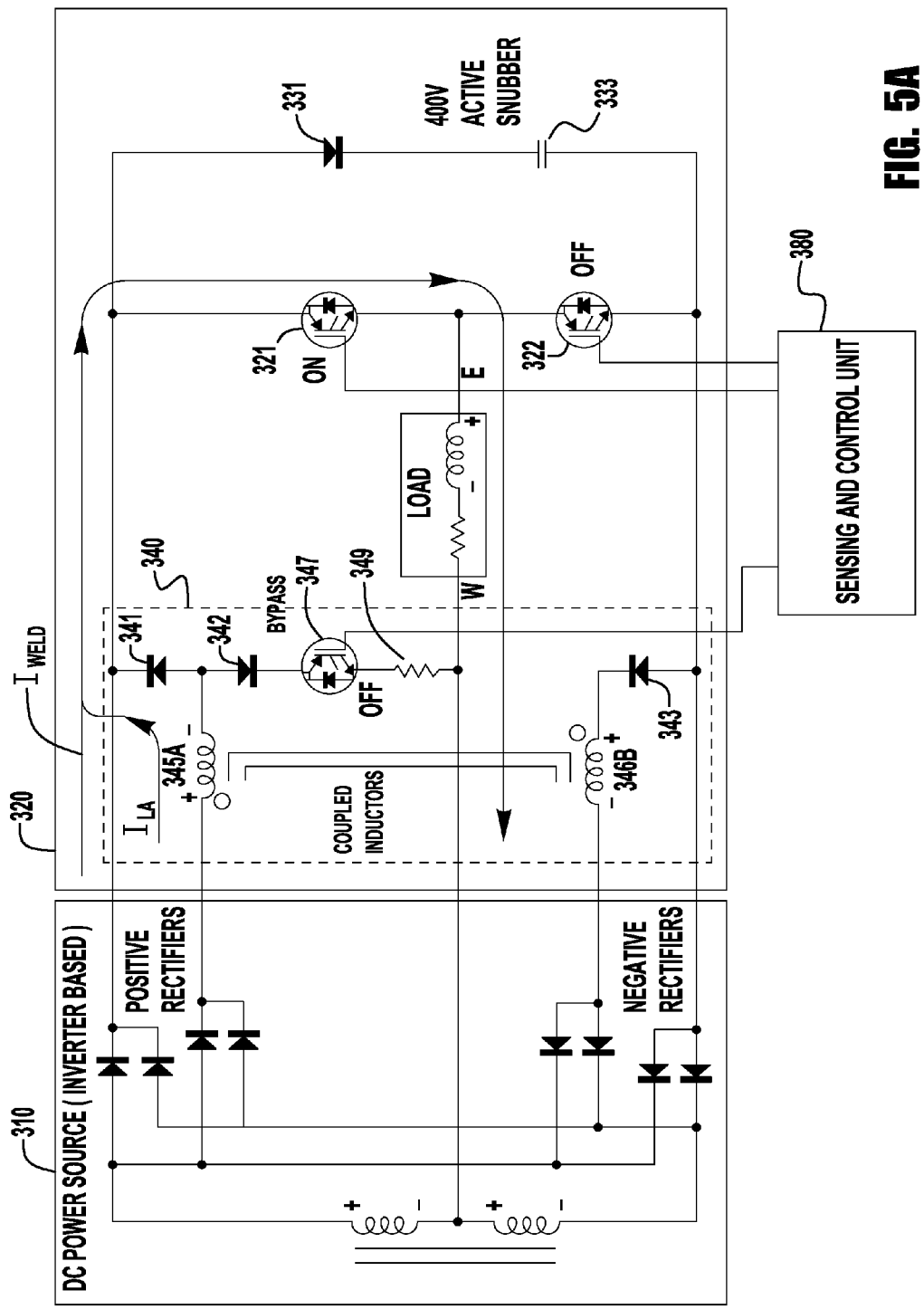
FIGS. 5A-5E illustrate the operation of an exemplary power supply using a half-bridge operation.

As illustrated in FIG. 5A, during the positive pulse period (segment 401 in FIG. 6) of waveform 400, the switch 321 is ON (closed) and switch 322 is OFF (open). Thus, once the arc 30 is re-established by inductor 345A, the current $I_{WELD}$ will flow from the Positive Rectifiers of DC power source 310 to the center-tap of DC power source 310 via switch 321, electrode E, LOAD, and then through workpiece W. During this time, the inductor 345A will discharge its stored energy and current $I_{LA}$ (segment 451 in FIG. 6) will also flow to the center-tap of DC power source 310 via diode 341, switch 321, electrode E and then through workpiece W. As with the full-bridge circuit, the inductor current $I_{LA}$ helps to stabilize the arc 30 during low current welding operations.

Figure 5B:
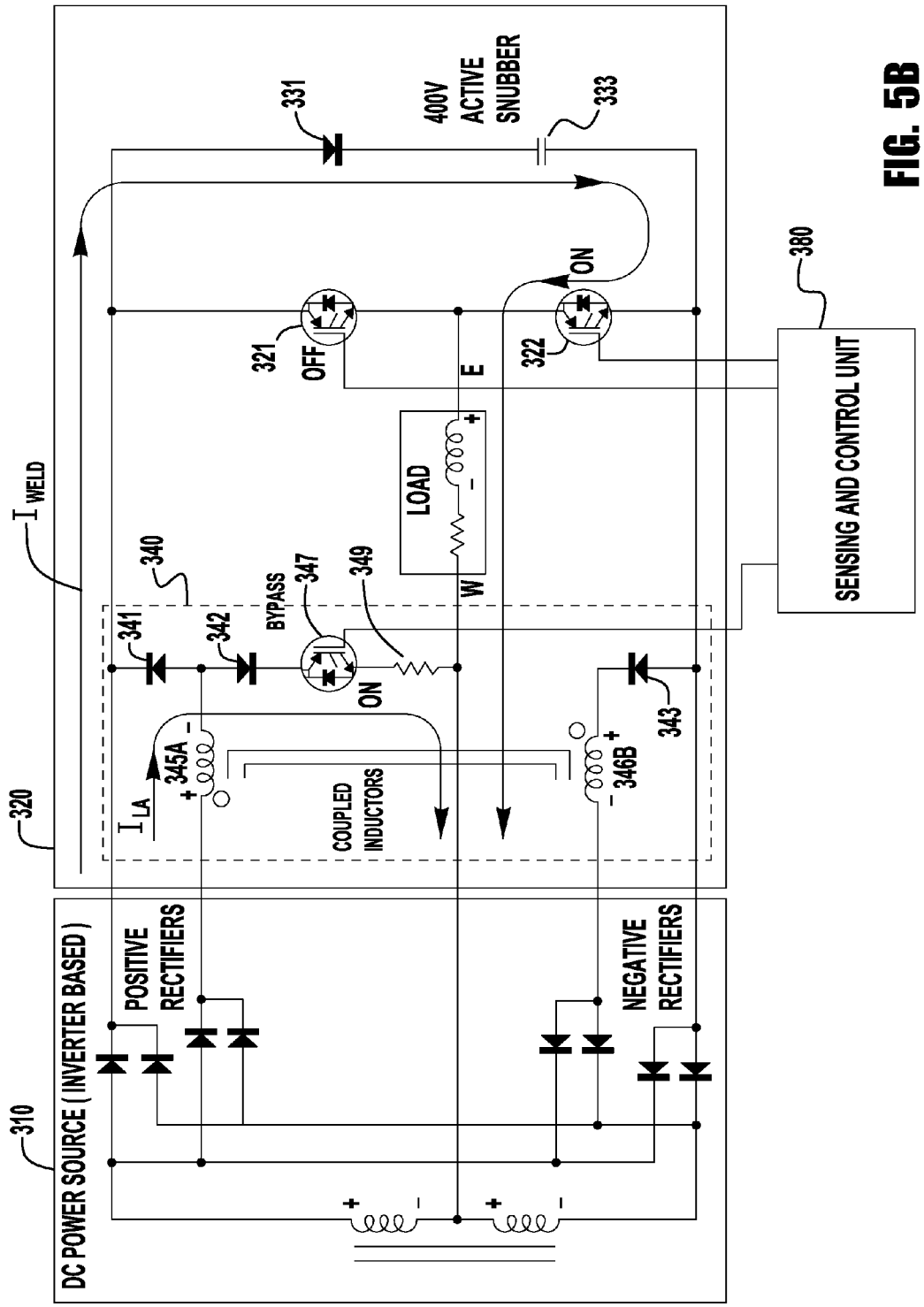

At the end of the positive pulse period (segment 401), the welding waveform 400 switches polarity and goes to the negative pulse period (segment 403) after the positive decay period (segment 402). To hasten the positive decay period (segment 402), as illustrated in FIG. 5B, the weld current $I_{WELD}$ is diverted through diode 331 and to snubber 333 by switching switch 321 OFF (open) and turning switch 322 ON (closed) (current $I_{WELD}$ will flow through the anti-parallel diode of switch 322). During this time, the switch 347 is turned ON (closed) in order to charge coupled inductors 345A and 345B (see segment 451 in FIG. 6).

Figure 5C:
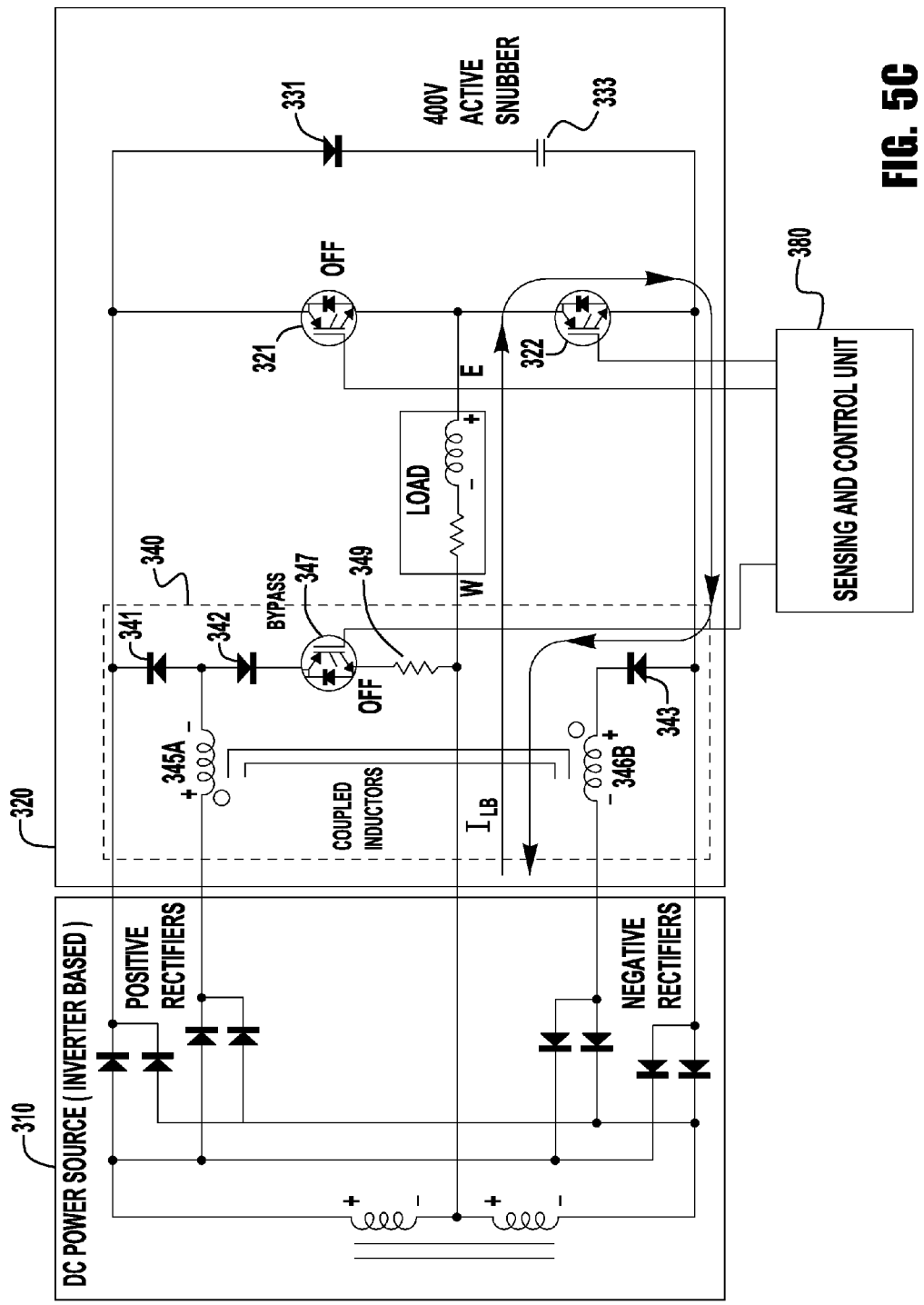
Figure 5D:
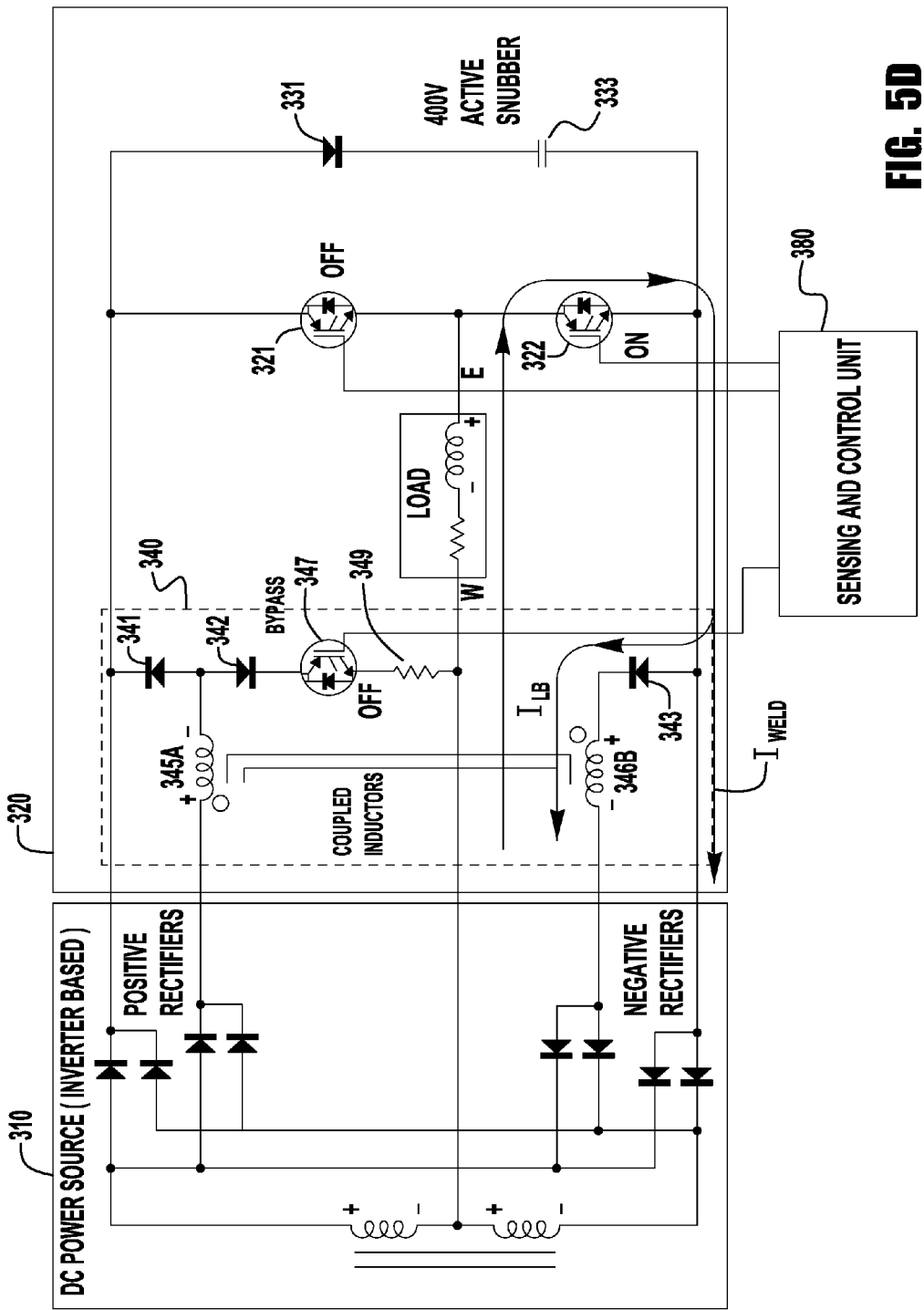

At the end of the positive decay period (segment 402), the arc 30 will extinguish as waveform 400 enters the negative pulse period (segment 403). When the switch 347 is turned OFF (open), as illustrated in FIG. 5C, the stored energy in inductor 345B will attempt to reestablish the current back to the Negative Rectifiers of DC power source 410 and this will cause a spark that re-ignites the arc 30 across the gap between workpiece W and electrode E. Once the arc 30 is re-ignited, current $I_{LB}$ (segment 461 of FIG. 6) will flow from the center-tap of DC power source 410 to the Negative Rectifiers of the DC power source 410 via the workpiece W, LOAD, electrode E, switch 322, diode 343, and inductor 345B. As shown in FIG. 5D, once the arc 30 (and the current path) is established, the weld current $I_{WELD}$ with also flow from the center-tap of DC power source 410 to the Negative Rectifiers.

Figure 5E:
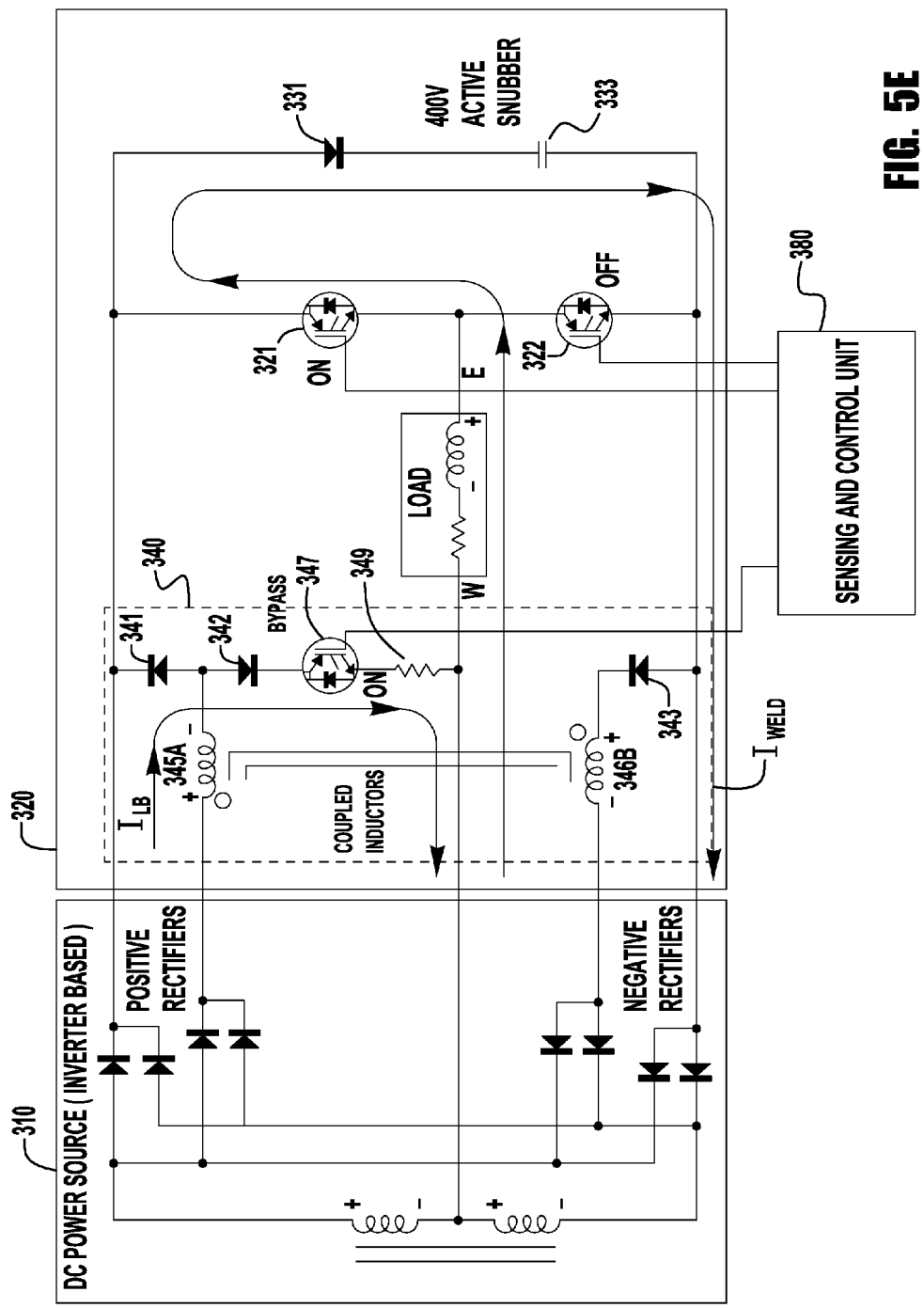
Figure 6:
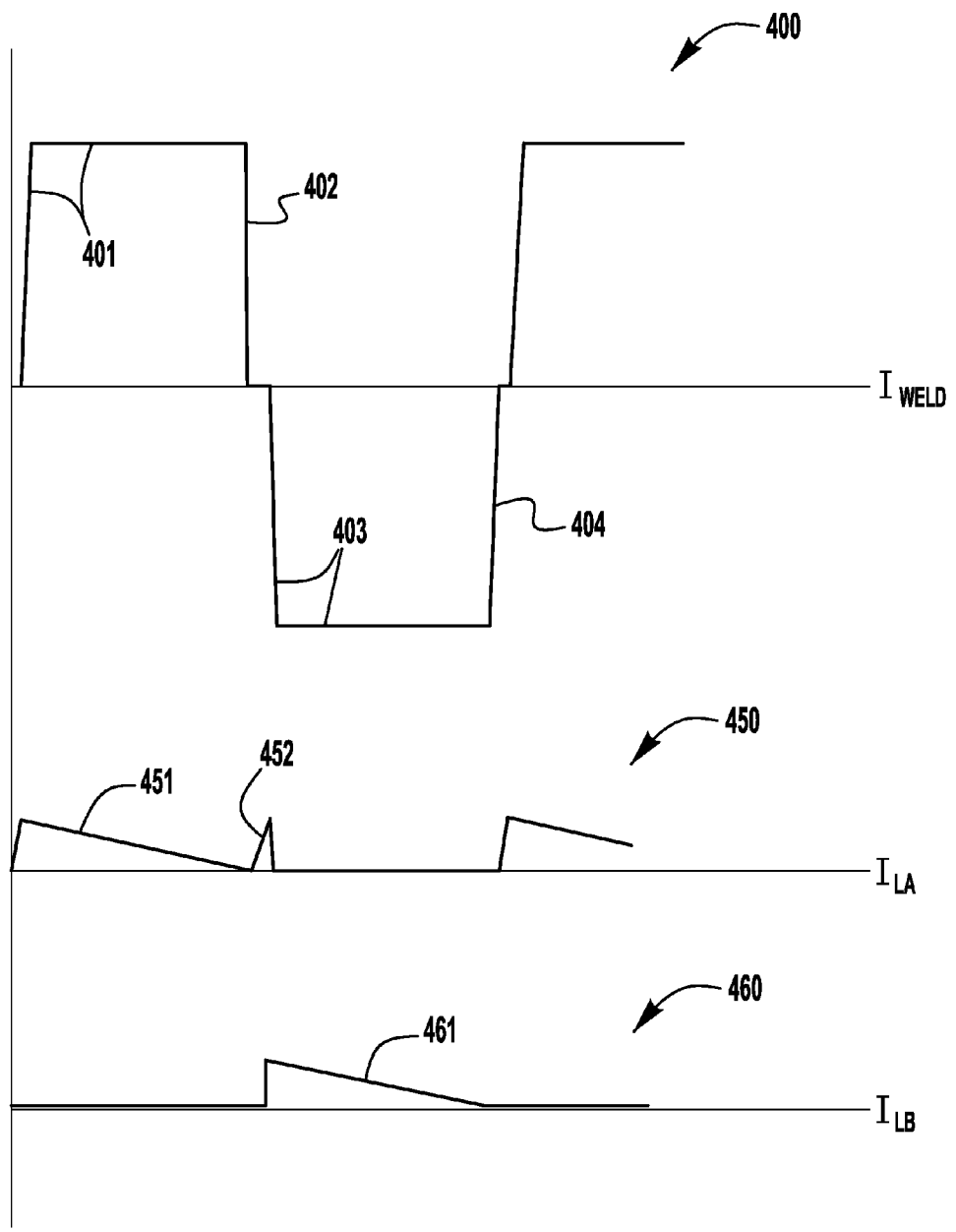
FIG. 6 illustrates an exemplary output welding waveform and exemplary inductor currents from the re-ignition and stabilization circuit of FIGS. 5A-5E.

At the end of the negative pulse period (segment 403) of waveform 400, the waveform enters the negative decay period (segment 404 of FIG. 6). As shown in FIG. 5E, during the negative decay period, the switch 321 is turned ON (closed) and switch 322 is turned OFF (open) to direct the current $I_{WELD}$ through diode 331 to snubber 333 via the anti-parallel diode of switch 321. During this time, the switch 347 is turned ON (closed) to charge coupled inductors 345A and 345B. At the end of the negative pulse period (segment 404), the arc 30 is re-ignited by inductor 345A and the waveform transitions to the positive pulse period (segment 401) as discussed above.

The above exemplary embodiments are generally described with respect to welding applications and, more specifically, to TIG welding applications. However, the present invention is not limited to TIG welding applications and can include other welding, cladding, brazing technologies as long as there is an arc.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

We claim:

1. A system for re-igniting and stabilizing an arc in arc welding applications, said system comprising:
   an output system that provides an output waveform to one of an electrode and a workpiece, said output waveform comprising a positive period and a negative period;
   an inductive discharge and stabilization system operatively connected to said output system and comprising at least one inductor; and
   a control unit operatively connected to said inductive discharge and stabilizing system and said output system,
   wherein said positive period comprises a positive decay period prior to a transition to said negative period, and said negative period comprises a negative decay period prior to a transition to said positive period,
   wherein said at least one inductor re-ignites an arc between said electrode and said workpiece during said transition period between from said positive period to said negative period and said transition period from said negative period to said positive period,
   wherein said at least one inductor provides a stabilizing current to stabilize said arc during at least a portion of said positive period and at least a portion of said negative period,
   wherein said control unit controls said inductive discharge and stabilization system such that said at least one inductor is charged during said positive decay period and said negative decay period.

2. The system of claim 1, wherein said output system comprises a snubber circuit to facilitate said positive decay period and said negative decay period.

3. The system of claim 2, wherein energy of said arc is dissipated through said snubber circuit as said at least one inductor is being charged.

4. The system of claim 1, wherein said control unit monitors at least a charge status of said at least one inductor, and
   wherein said control unit controls said charging of said at least one inductor based on said charge status.

5. The system of claim 1, wherein said output system comprises a full-bridge circuit.

6. The system of claim 1, wherein said output system comprises a half-bridge circuit.

7. A system for re-igniting and stabilizing an arc in arc welding applications, said system comprising:
   an output system that provides an output waveform to one of an electrode and a workpiece, said output waveform comprising a positive period and a negative period;
   an inductive discharge and stabilization system operatively connected to said output system and comprising at least one inductor; and
   a control unit operatively connected to said inductive discharge and stabilizing system and said output system,
   wherein said positive period comprises a positive decay period prior to a transition to said negative period, and said negative period comprises a negative decay period prior to a transition to said positive period,
   wherein said at least one inductor re-ignites an arc between said electrode and said workpiece during said transition period between from said positive period to said negative period and said transition period from said negative period to said positive period,
   wherein said at least one inductor provides a stabilizing current to stabilize said arc during at least a portion of said positive period and at least a portion of said negative period,
   wherein said output system comprises a half-bridge circuit,
   wherein said at least one inductor comprises a first inductor and a second inductor, and
   wherein said first inductor and said second inductor are coupled.

8. The system of claim 1, wherein said at least one inductor is between 300 micro-henries to 900 micro-henries.

9. The system of claim 2, wherein said snubber circuit comprises a capacitor that is in a range of 500 to 1500 microfarads.

10. A method of re-igniting and stabilizing an arc in arc welding applications, the said method comprising:
    providing an output waveform to one of an electrode and a workpiece, said output waveform comprising a positive period and a negative period, said positive period comprises a positive decay period prior to a transition to said negative period, and said negative period comprises a negative decay period prior to a transition to said positive period;
    providing at least one inductor;
    controlling said at least one inductor to re-ignite an arc between said electrode and said workpiece during said transition period between from said positive period to said negative period and said transition period from said negative period to said positive period, and
    charging said at least one inductor during said positive decay period and said negative decay period,
    wherein said at least one inductor provides a stabilizing current to stabilize said arc during at least a portion of said positive period and at least a portion of said negative period.

11. The method of claim 10, further comprising:
    facilitating said positive decay period and said negative decay period by dissipating energy of said arc to a snubber circuit.

12. The method of claim 11, wherein said dissipating of said energy is done as said charging of said at least one inductor.

13. The method of claim 10, further comprising:
    monitoring at least a charge status of said at least one inductor, and wherein said charging of said at least one inductor is based on said charge status.

14. The method of claim 10, wherein said waveform is provided by a full-bridge circuit.

15. The method of claim 10, wherein said waveform is provided by a half-bridge circuit.

16. A method of re-igniting and stabilizing an arc in arc welding applications, the said method comprising:
    providing an output waveform to one of an electrode and a workpiece, said output waveform comprising a positive period and a negative period, said positive period comprises a positive decay period prior to a transition to said negative period, and said negative period comprises a negative decay period prior to a transition to said positive period;
    providing at least one inductor; and
    controlling said at least one inductor to re-ignite an arc between said electrode and said workpiece during said transition period between from said positive period to said negative period and said transition period from said negative period to said positive period,
    wherein said waveform is provided by a half-bridge circuit, wherein said at least one inductor comprises a first inductor and a second inductor, and wherein said first inductor and said second inductor are coupled.

17. The method of claim 10, wherein said at least one inductor is between 300 micro-henries to 900 micro-henries.

18. The method of claim 11, wherein said snubber circuit comprises a capacitor that is in a range of 500 to 1500 microfarads.

19. The system of claim 7, wherein said control unit controls said inductive discharge and stabilization system such that said at least one inductor is charged during said positive decay period and said negative decay period.

20. The system of claim 19, wherein said output system comprises a snubber circuit to facilitate said positive decay period and said negative decay period.

21. The system of claim 20, wherein energy of said arc is dissipated through said snubber circuit as said at least one inductor is being charged.

22. The system of claim 19, wherein said control unit monitors at least a charge status of said at least one inductor, and wherein said control unit controls said charging of said at least one inductor based on said charge status.

23. The system of claim 7, wherein said at least one inductor is between 300 micro-henries to 900 micro-henries.

24. The system of claim 20, wherein said snubber circuit comprises a capacitor that is in a range of 500 to 1500 microfarads.

25. The method of claim 16, further comprising:
charging said at least one inductor during said positive decay period and said negative decay period.

26. The method of claim 25, further comprising:
facilitating said positive decay period and said negative decay period by dissipating energy of said arc to a snubber circuit.

27. The method of claim 26, wherein said dissipating of said energy is done as said charging of said at least one inductor.

28. The method of claim 25, further comprising:
monitoring at least a charge status of said at least one inductor, and wherein said charging of said at least one inductor is based on said charge status.

29. The method of claim 16, wherein said at least one inductor is between 300 micro-henries to 900 micro-henries.

30. The method of claim 26, wherein said snubber circuit comprises a capacitor that is in a range of 500 to 1500 microfarads.

* * * * *